(12) United States Patent  (10) Patent No.: US 6,340,133 B1
Capanna  (45) Date of Patent: Jan. 22, 2002

(54) SYSTEM TO TRANSFORM A HORIZONTAL TAKE-OFF AND SELF-SUSTAINED HORIZONTAL FLIGHT AIRPLANE INTO SELF-SUSTAINED HORIZONTAL FLIGHT, VERTICAL LANDING AND TAKE-OFF, HYBRID INTEGRATED AIRPLANE

(76) Inventor: Franco Capanna, Via Quarto Peperino, 30 - 00188 Rome (IT)

( * ) Notice: Subject to any disclaimer, the term of this patent is extended or adjusted under 35 U.S.C. 154(b) by 0 days.

(21) Appl. No.: 09/581,312
(22) PCT Filed: Dec. 9, 1998
(86) PCT No.: PCT/IT98/00355
§ 371 Date: Jun. 12, 2000
§ 102(e) Date: Jun. 12, 2000
(87) PCT Pub. No.: WO99/29570
PCT Pub. Date: Jun. 17, 1999

(30) Foreign Application Priority Data

Dec. 10, 1997 (IT) ........................................ RM97A0762

(51) Int. Cl.⁷ ............................................... B64C 27/22
(52) U.S. Cl. .......................... 244/6; 244/23 B; 244/55; 244/12.3; 244/66
(58) Field of Search .......................... 244/6, 15, 23 B, 244/55, 12.1, 58, 12.3, 56, 66, 198

(56) References Cited

U.S. PATENT DOCUMENTS

| | | | | |
|---|---|---|---|---|
| 1,662,406 A | * | 3/1928 | Thompson | 244/6 |
| 1,783,458 A | * | 12/1930 | Windsor | 244/6 |
| 1,844,786 A | * | 2/1932 | Nelson | 244/6 |
| 1,889,255 A | * | 11/1932 | Leray | 244/6 |
| D113,880 S | * | 3/1939 | Rogers | 244/6 |
| 3,156,434 A | | 11/1964 | Harrington | 244/7 R |
| 3,241,791 A | * | 3/1966 | Piasecki | 244/6 |
| 3,278,138 A | | 10/1966 | Haberkorn | 244/12.3 |
| 3,298,633 A | * | 1/1967 | Dastoli et al. | 244/56 |
| 3,454,241 A | * | 7/1969 | Riemerschmid | 244/55 |
| 3,469,803 A | * | 9/1969 | Schmielau | 244/55 |
| 3,823,898 A | | 7/1974 | Eickmann | 244/55 |
| 4,492,353 A | * | 1/1985 | Phillips | 244/55 |
| 4,757,962 A | * | 7/1988 | Grant | 244/12.3 |
| 5,244,167 A | | 9/1993 | Turk et al. | 244/12.1 |
| 5,246,188 A | | 9/1993 | Koutsoupidis | 244/12.3 |

* cited by examiner

Primary Examiner—J. Woodrow Eldred
(74) Attorney, Agent, or Firm—Young & Thompson

(57) ABSTRACT

The present invention relates to a system for the transformation of a traditional self-sustained horizontal take-off and landing aircraft into hybrid, integrated, self-sustained vertical take-off and landing and horizontal flight comprising, besides the propulsion system already provided in the aircraft, a hydraulic propulsion system, activating at least a blade rotor (1), to be used during the vertical take-off and landing and transition phases, said hydraulic system being powered by the engines of the aircraft, and at least an auxiliary engine (2), provided in a rear position and/or under the aircraft, said at least an auxiliary engine being progressively tiltable and swingable between two limit positions, respectively vertical position and horizontal position, said standard propulsion means of the aircraft being deactivated during the vertical take-off and landing and the transition and activated during the self-sustained horizontal flight, and said at least an auxiliary engine and said at least one auxiliary engine being operating during the vertical take-off and landing and the transition and deactivated during the self-sustained horizontal flight.

18 Claims, 4 Drawing Sheets

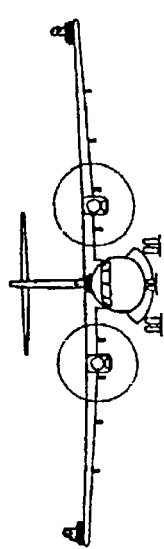
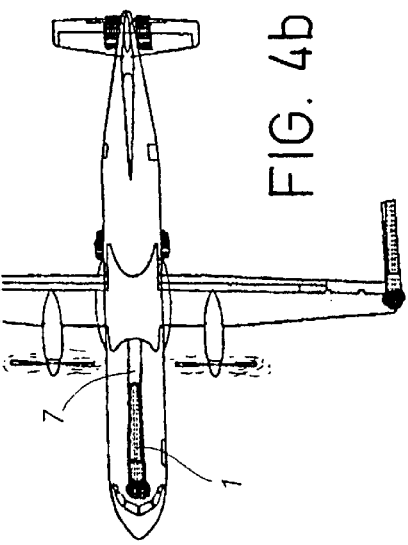
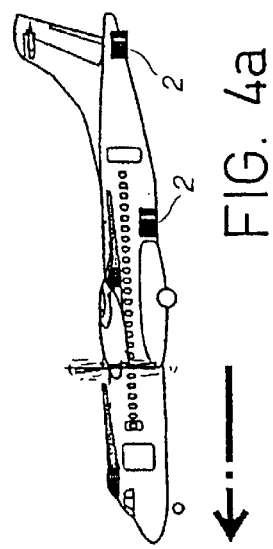
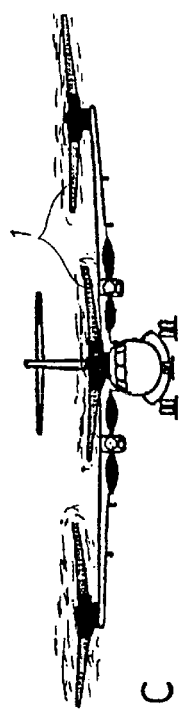
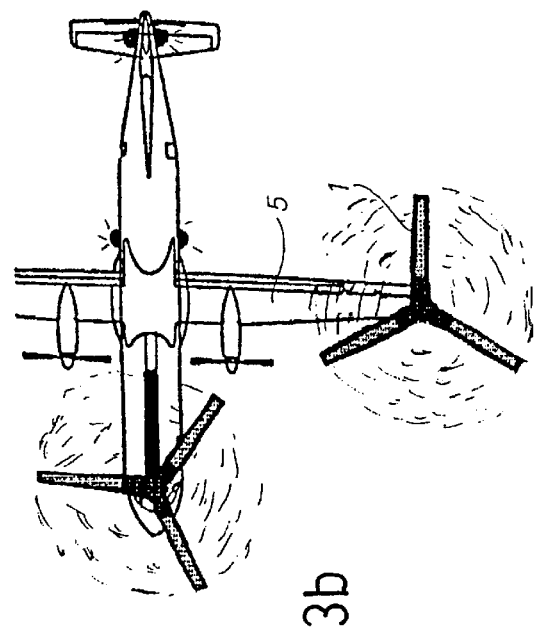
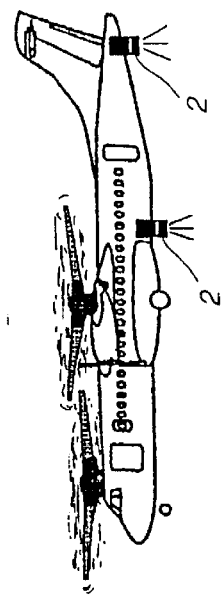

SYSTEM TO TRANSFORM A HORIZONTAL TAKE-OFF AND SELF-SUSTAINED HORIZONTAL FLIGHT AIRPLANE INTO SELF-SUSTAINED HORIZONTAL FLIGHT, VERTICAL LANDING AND TAKE-OFF, HYBRID INTEGRATED AIRPLANE

BACKGROUND OF THE INVENTION

The present invention relates to system to transform a horizontal take-off and self-sustained horizontal flight airplane into self-sustained horizontal flight, vertical landing and take-off, hybrid integrated airplane.

More particularly, the invention concerns a system of the above kind that transforms an existing traditional airplane into a vertical take-off and landing and horizontal flight airplane by a conversion operation that is extremely simple and not too expensive.

As it is well known, a main advantage, under a practical point of view, of the vertical take-off and landing aircrafts, also known as VTOL (Vertical Take-Off Landing), is the capability of reaching anyone, everything, everywhere when used for transportation and environment and civil protection services.

These advantages are counterbalanced by the high operating costs of the existing VTOL technology, particularly helicopters, with respect to the other vehicles and transportation systems.

Increased costs are due to the very high amount of power necessary to sustain the helicopter during its horizontal flight, in view of the absence of aerodynamical sustaining thrust of the fixed wings which are provided in traditional aircraft.

On the other side, this drawback is partially reduced in view of the absence of transportation costs and time from the town to the airport, since it is possible to directly land downtown, the heliport requiring a reduced space with respect to the traditional airports, thus saving time, and requiring simpler embarkation procedures.

A main object of the present invention is that of merging the capability of VTOL aircraft with the horizontal flight powered by turbo-propulsors or jet engines (in the following this hybrid feature will be indicated by VTOL-HF-Vertical Take-Off Landing-Horizontal Flight).

It is also known to those skilled in the art that two model of aircraft provided with interchangeable integrated VTOL-HF characteristics have been already developed in the international aerospace industry, namely Harrier and V-22 Osprey.

Harriers are military jet aircrafts made in Great Britain by a British Arerospace and McDonnel Douglas joint-venture.

Instead, V-22 Osprey are military turbo-propulsor aircrafts, providing a tiltable rotor-engine group and are made in the United States by Bell Textron and Boeing. It has already been foreseen the realisation of a civil version.

As far as Harrier are concerned, VROL capability is obtained rotating downward the thrust of its main jet engines during the takeoff/landing steps.

Instead, V-22 Osprey VTOL-HF are based on the direct use of the same main engines and of the relevant thrust mechanisms both in the helicopter mode (VTOL) and as turbo propeller (HF) rotating (tilting) from the above toward the bottom the main engines provided at the ends of the wings.

Thrust mechanisms of the V-22 are designed on the basis of a compromise between big propellers and rotor blades, it being necessary that they work both as turbo propeller (HF) and as helicopter (VTOL).

Both solutions concern aircraft specifically dedicated, particularly designed to be used as VTOL-HF: when they are flying horizontally they use the same main engines sized on the basis of the maximum thrust necessary for vertical take-off and landing, with a consequent impact on the operating costs.

SUMMARY OF THE INVENTION

The solution suggested according to the present invention provides that the main engines do not tilt upward and downward, remaining in the standard horizontal position (HF) in any flight phase, using the standard propellers or the jet engines already provided for the horizontal flight; the supplemental capability necessary for the VTOL take-off thrust is obtained by the transfer of the thrust to standard rotor VTOL engines operated by hydraulic pumps/actuators, as well as by little tiltable reaction engines provided in the rear portion and/or fuselage, deactivated (not used) during the horizontal flight. Said little reaction engines can also be comprised of ducted turbofan propellers operated or not by the hydraulic system.

The solution suggested according to the present invention provides that main engines do not tilt upward and downward, remaining in the standard horizontal position (HF) in any flight step, using the standard propellers, or the jet engines already provided for the horizontal flight; the supplementary capability necessary for the VTOL take off thrust is obtained by the transfer of the thrust from the same standard engines to VTOL rotors operated by hydraulic pumps/actuators, as well as small tiltable reactors provided in the rear part and/or under the fuselage, deactivated (not usable) during the horizontal flight. Said small reactors can be also comprised of ducted turbo fan propellers powered or not by the hydraulic system.

An object of the present invention is that of providing a low cost vertical take off and landing and self-sustained horizontal flight integrated system (VTOL-HF).

Another object of the present invention is that of providing a system allowing an easy modification by retrofitting the existing vehicles (both new or used airplane and helicopters) for the transformation into VTOL-HF airplane, introducing little structural modifications.

Still another object of the present invention is that of providing a system allowing to improve the safety during the transition phase in an "one engine out" situation.

A further object of the present invention is that of realising a system of the above kind which is highly reliable and having advantages under the aerodynamic and loading aspects.

Still another object of the present invention is that of providing a system that can be used on jet engine aircrafts, helicopters and intermodal vehicles (such as boats and cars).

It is therefore specific object of the present invention a system for the transformation of a traditional self-sustained horizontal take off and landing aircraft into hybrid, integrated, self-sustained vertical take-off and landing and horizontal flight comprising, besides the propulsion system already provided in the aircraft, a hydraulic propulsion system, activating at least a blade rotor, to be used during the vertical take-off and landing and transition phases, said hydraulic system being powered by the engines of the aircraft, and at least an auxiliary engine, provided in a rear position and/or under the aircraft, said at least an auxiliary engine being progressively tiltable and swingable between two limit positions, respectively vertical position and horizontal position, said standard propulsion means of the aircraft being deactivated during the vertical take-off and landing and the transition and activated during the self-sustained horizontal flight, and said at least an auxiliary engine and said at least one auxiliary engine being operating during the vertical take-off and landing and the transition and deactivated during the self-sustained horizontal flight.

More particularly, according to the invention, and in function of the aircraft dimensions, one or more blade rotors are provided, operated by a hydraulic propulsion system powered by the main engines, said rotors being provided on the aircraft fuselage, on the front, central or rear portion, or on the wings, in order to guarantee the vertical take-off and landing of the aircraft.

Preferably, according to the invention, said at least one auxiliary engine is comprised of at least a jet engine, or of at least a rocket, or of at least a hydraulically or not powered, ducted turbofan propeller.

Still according to the invention, at least one or more tiltable auxiliary engines are provided, mainly placed in the rear portion of the aircraft or on the bottom portion of the same, to be used during the vertical take-off and landing and transition phases.

Always according to the invention, vertical rotor or rotors are fixed in their position even when they are deactivated during the horizontal flight, being it possible that they are suitably faired within an aerodynamic structures or within the wings.

Furthermore, according to the invention, said rotors can be folded when not used and can be housed within a housing provided in the aircraft fuselage.

According to the invention, said system can be used also to transform helicopters into VROL-HF integrated aircrafts or for boats to be transformed into VTOL water-air vehicle, or for motor vehicles to be transformed into VTOL ground-air vehicles.

BRIEF DESCRIPTION OF THE DRAWINGS

The present invention will be now described, for illustrative but not limitative purposes, according to its preferred embodiments, with particular reference to the figures of the enclosed drawings, wherein:

FIGS. 3a, 3b and 3c show in lateral, top and front view, respectively, a second embodiment of an aircraft provided with the system according to the invention in a vertical take-off/landing phase;

FIGS. 4a, 4b and 4c show in lateral, top and front view, respectively, the aircraft provided with the system according to the invention of FIG. 3 in a horizontal flight phase;

DESCRIPTION OF THE PREFERRED EMBODIMENTS

Figure 2A:
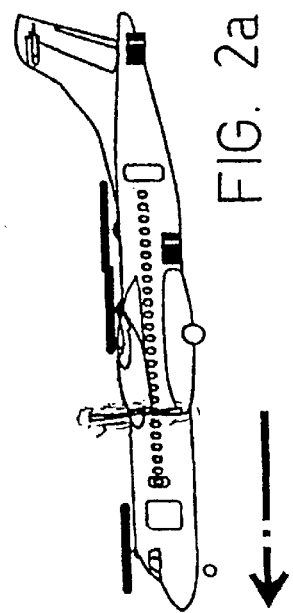
FIGS. 2a, 2b and 2c show in lateral, top and front view, respectively, the aircraft provided with the system according to the invention of FIG. 1 in a horizontal flight phase.
Figure 2B:
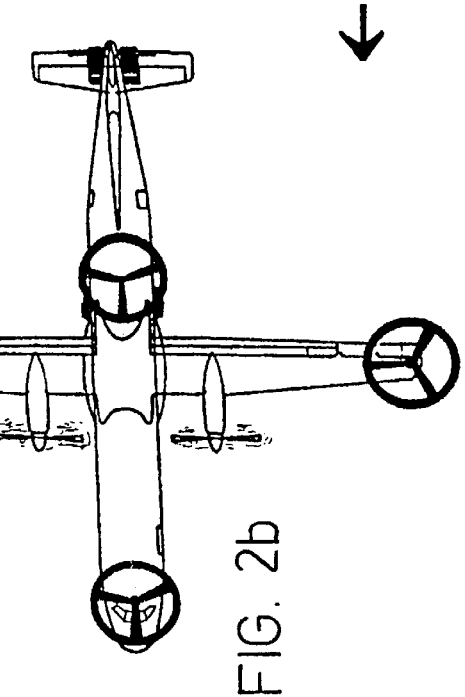
Figure 2C:
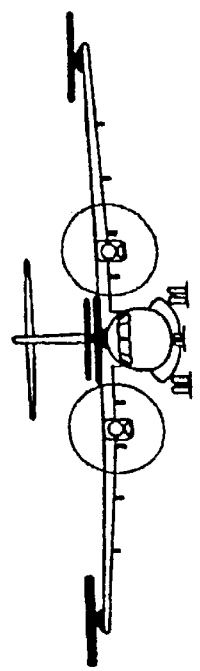
Figure 1A:
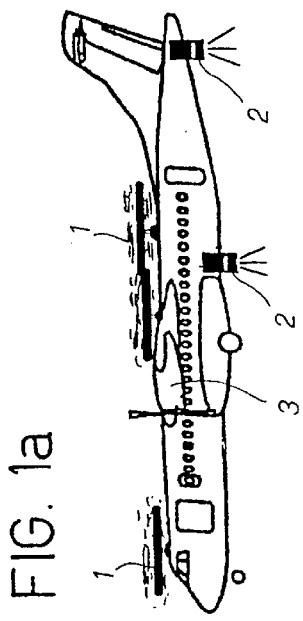
FIGS. 1a, 1b and 1c show in lateral, top and front view, respectively, a first embodiment of an aircraft provided with the system according to the invention in a vertical take-off/landing phase.
Figure 1B:
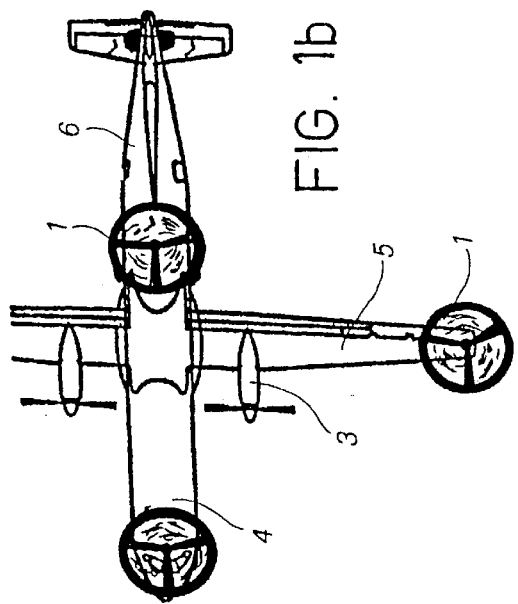
Figure 1C:
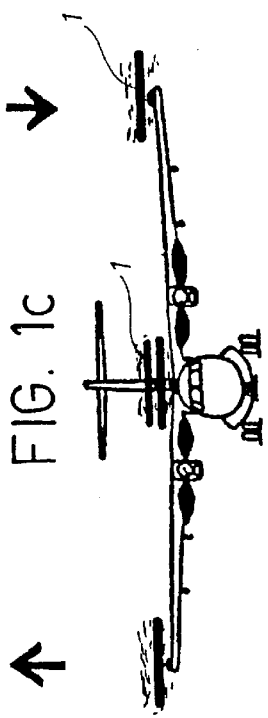
Figure 6C:
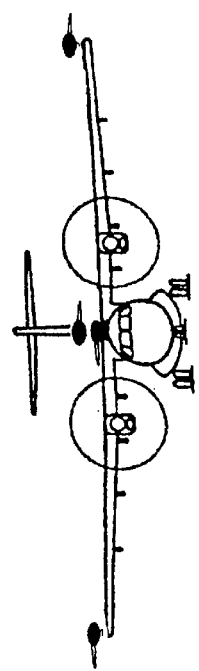
FIGS. 6a, 6b and 6c show in lateral, top and front view, respectively, the aircraft provided with the system according to the invention of FIG. 5 in a horizontal flight phase.
Figure 6B:
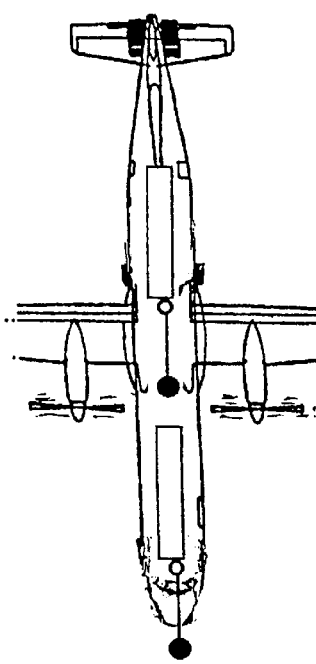
Figure 6A:
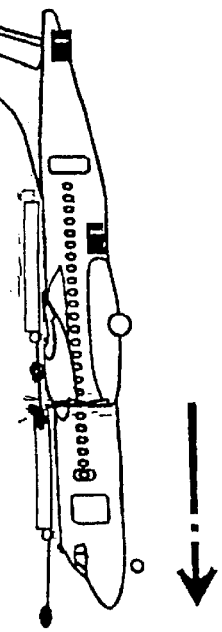
Figure 5C:
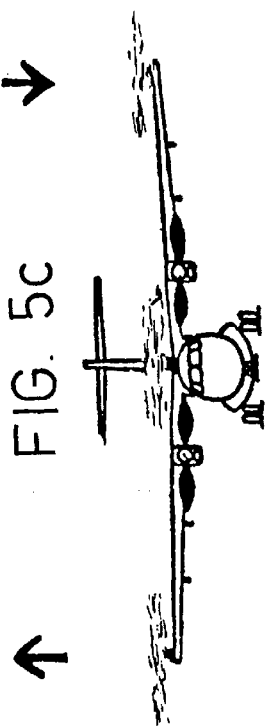
FIGS. 5a, 5b and 5c show in lateral, top and front view, respectively, a third embodiment of an aircraft provided with the system according to the invention in a vertical take-off/landing phase.
Figure 5B:
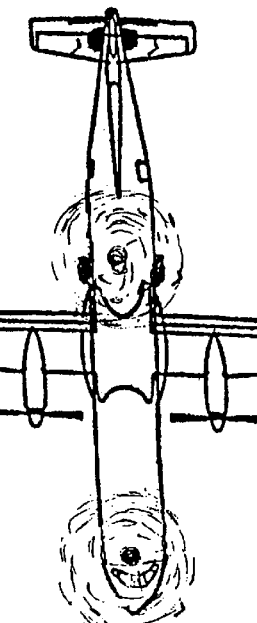
Figure 5A:
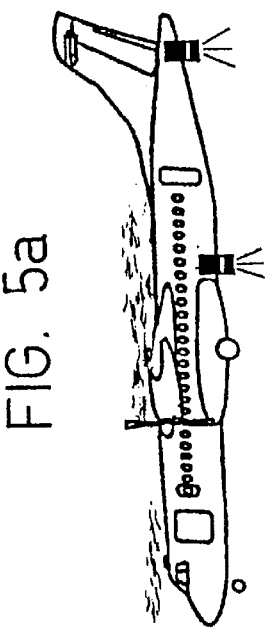

In the following specification, it will be made reference at the same time to all the figures of the enclosed drawings, being put each time into evidence the differences among the three embodiments shown in the drawings.

As already said, the system according to the invention modifies an existing aircraft. The basic parts of the system according to the invention are the vertical take-off and landing capability (VTOL) ensured by the integrated vertical thrust of VTOL rotor (or rotors) blades 1 powered by hydraulic engines (not shown), as well as of the integrative thrust of the auxiliary engines and of the jet engines 2 or rockets or hydraulically powered or not, ducted turbofan propellers.

Particularly, one or more VTOL rotor blades 1 are provided, powered by light and efficient hydraulic engines having suitable dimensions, activated by a hydraulic system connected to, and activated by the thrust source of the main engines 3.

During the landing and take-off phase, shafts of main engines 3 are temporarily disconnected from their standard propellers and are connected to a hydraulic compressor (not shown), by a clutch or other suitable gear.

In this way, 100% of the main engine or engines thrust is transferred by the hydraulic system, thus operating the hydraulic engine or engines and the relevant VROL rotors while taking-off or landing.

Figure 7:
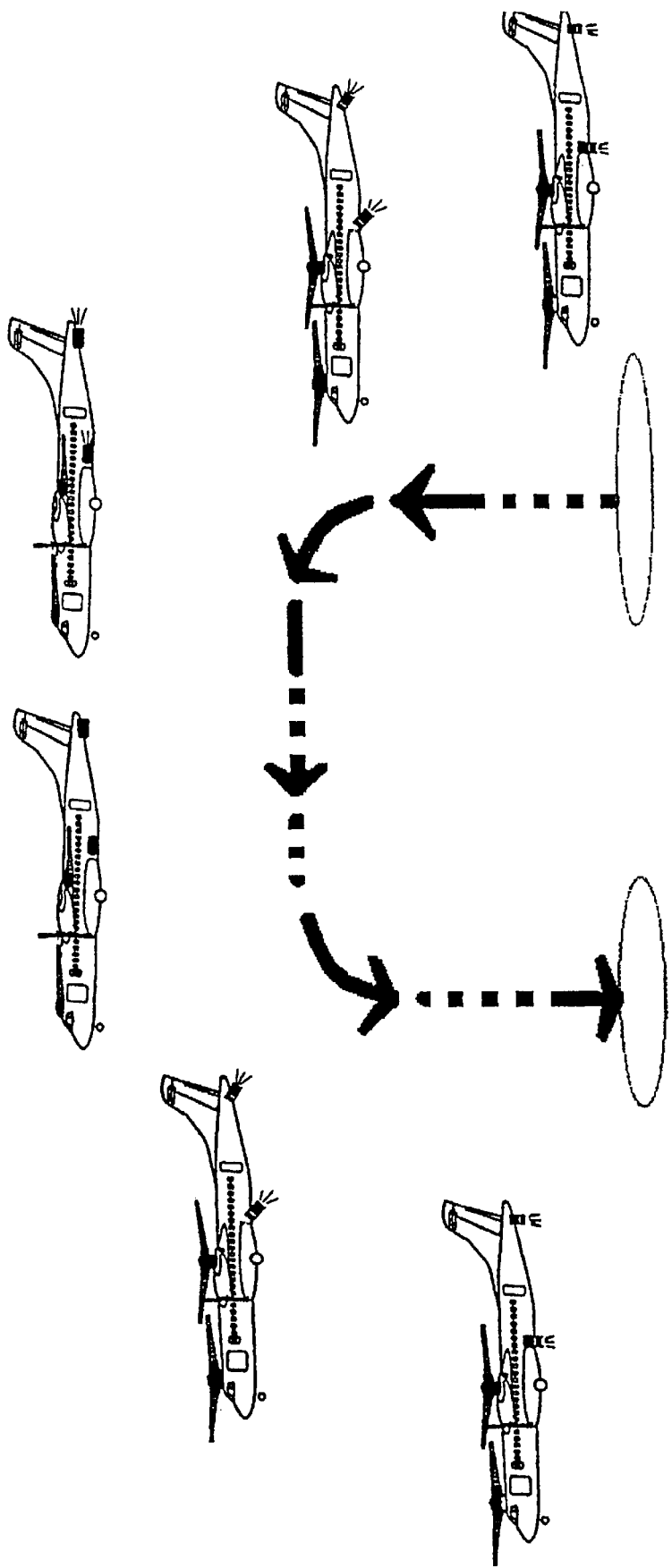
FIG. 7 schematically show the different take-off, flight and landing phases of a flight according to the invention.

All the thrust (or a lower fraction of the thrust) diverted toward the hydraulic system is then transmitted to the propellers 3 for the forward horizontal flight (HF) after the end of take-off (to this end please refer to FIG. 7).

The hydraulic engine(s) and the relevant rotor(s) blade 1 are usually provided, in case of small aircrafts, on the upper part of the fuselage 4. If two or more rotor blades 1 are necessary, their position will be any suitable position, such as the wing ends 5, the upper portion of the fuselage, or on the tail 6.

As it can be seen from the three different embodiments respectively shown in FIGS. 1 and 2, 3 and 4 and 5 and 6, rotors 1 can be:

fixed (FIGS. 1 and 2): blades 1 are aerodynamically housed and locked while in the horizontal flight (HF) phase. If employed, counterbalanced blades can be housed but only locked with the balance forward directed.

Foldable (FIGS. 3 and 4): after the take-off phase and while in the horizontal flight (HF) phase, rotor blades 1 are automatically folded and overlapped one on the other (see particularly FIG. 4b). This blade 1 "assembly" is slowly brought into a longitudinal slot 7, realised in the upper portion of the fuselage 4 and/or as horizontal aerodynamical housing on the wing ends 5, when the rotor blades 1 re on the wings 5.

double use to add a further thrust if in VTOL and HF phase (FIGS. 5 and 6), in particular cases.

One or more jet tiltable auxiliary engines 2 or tiltable rockets (for example derived from radio-controlled target missiles or aircrafts 9 or ducted turbofan propellers provided in the rear lower portion of the aircraft and/or under the fuselage 4, integrate the main engines 3 and hydraulic rotor blades 1 thrust for the vertical take-off or landing VTOL.

Said auxiliary engine(s) by its thrust and the directional motion of the same thrust ensures the transition phase from VROL to HF (and vice versa), and is used as follow in the VTOL-HF phases:

Take-off: the aforementioned auxiliary engines are oriented downward providing a thrust and a speed sufficient to support and to complete the hydraulic rotor blades 1 thrust, as well as to guarantee the balancing in a horizontal position;

After the take-off until the transition: auxiliary engines are progressively rotated from the position with a downward thrust toward the horizontal position with a thrust toward the rear portion (see FIG. 7): thus a thrust is obtained that from the bottom (thus thrusting the aircraft upward) progressively rotates toward a thrust directed rearward, (thus thrusting the aircraft upward);

During the transition toward the horizontal flight: the aforementioned auxiliary engines progressively direct their thrust toward the rear portion of the aircraft; aid thrust has the maximum speed to sustain the beginning of the horizontal flight before of, and while it, established the thrust coming from the main engine(s) 3 to the propellers for the horizontal flight. Support of auxiliary engines is in this phase necessary to maintain the HF speed higher than the stall speed;

horizontal flight: auxiliary engines are aligned with respect to the fuselage and can be deactivated;

during the transition to the vertical landing the opposite occurs with respect to the transition toward the horizontal flight, restoring the working of the hydraulic engine and rotor blades 1 system, interrupting the operation of the standard propellers (or jets) by the main engines 3;

landing: during this phase it occurs the opposite with respect to what set forth following to the take-off phase;

finish of the landing: the same functions of the take-off phase occur.

In case only one blade 1 is installed on the aircraft, the auxiliary engine system (jet/rockets-turbofan) will be used during the landing-take-off phases also as tail stabiliser, thus avoiding the aircraft rotation.

All the phases described in the above can be carried out employing either jet engines/rockets and hydraulically activated or not turbofan ducted propellers.

During the horizontal flight HF phase, capability is conferred by the standard use of the main engine(s) 3 and by the relevant propeller(s) or jet engine(s).

In this way, in the HF mode, aircraft can be practically considered equal to a turbo-propeller model (or a jet model), which is cheap, since it has been eliminated by the absorption of the hydraulic system and of the auxiliary engines 2. Furthermore, the shaft thrust from the engines to the propellers 3 is restored, while VTOL rotors 1 are locked and aerodynamically harmonised with the aircraft.

In case it should occur that an engine is out of order, the following features of the VTOL-HF system according to the invention can be exploited:

it ensure safety redundancy (IV) connecting the hydraulic systems from each main engine 3 with all the hydraulic actuator connected to the VTOL rotors installed on the aircraft;

a suitable valve system allows that it is possible to obtain the standard operation even of a single main engine 3 connected with one or more hydraulic engines;

jet/rockets auxiliary engines, now in a stand-by situation, represent a further safety guarantee;

in case of failure of the main engine 3 (one engine out), the hydraulic system supporting the other engine(s) operates, replacing the one not working and guaranteeing an emergency vertical landing procedure by the hydraulic rotors and the supplemental support of the jet/rockets engine propulsion;

alternatively, the standard "one engine out" flight and the landing procedure can be carried out even following only the standard specifics of the aircraft according to the "one engine out" landing mode on a runway. This alternative also works in case of failure to the hydraulic system or to the hydraulic engine.

Coming back to compare the solution suggested according to the present invention with the known solutions, it must be noted that for the VTOL thrust, standard thrust and power of main engines, designed for a standard turbo-propeller aircraft, in line of principle are not sufficient to guarantee (a) the supplemental thrust necessary for the vertical take-of with respect to the take-of gross weight of the aircraft and (b) the restoring of the power loss ratio typical of the hydraulic systems.

The above mentioned difference of thrust necessary for VTOL (a+b) must be first of all compensated by the jet/rocket engines of suitable dimensions placed below and/or in the rear part of the aircraft.

Moreover, it can be provided an increase of the maximum power of the main engine(s) 3 for the critical VTOL and transition phases, lasting between 3 and 5 minutes in order to compensate the VROL thrust need (a+b).

Nevertheless, cost saving (fuel consumption) which is guaranteed during the horizontal flight by the present invention requires that said supplemental power of the main engine(s) occur only in the take-off-landing phases representing in a standard flight lasting about 1 hour a percentage not higher than to 10% of the total flying time.

During the designing and/or retrofitting of the main engines, it will be necessary to realise reducible power ratios (e.g. eliminating one or more engine stage or compressors) when the take-off is finished and the horizontal flight phase begins.

For the system according to the invention high efficiency cheaper dedicated blade-rotor assembly must be designed only for the vertical flight, since they are solely employed during this phase (and not also in the horizontal travelling as occurs for helicopters), also ensuring (in the foldable blade type) a following folding and housing (and vice versa) when the hydraulic pressure is eliminated (or activated again).

The sequential progression control of the flying phases must be aided by a computerised automatic procedure, which can be applied in different atmospheric conditions. A fast aided return by an automatic computer to the VROL condition must be provided in case of risk of stall during the transition phase or any other emergency.

The present invention has been described for illustrative but not limitative purposes, according to its preferred embodiments, but it is to be understood that modifications and/or changes can be introduced by those. skilled in the art without departing from the relevant scope as defined in the enclosed claims.

What is claimed is:

1. A system for transforming a traditional self-sustained horizontal take-off and landing aircraft with at least one engine for sustaining horizontal flight into a hybrid, integrated, self-sustained vertical take-off and landing and horizontal flight aircraft, said system comprising:

a hydraulic propulsion system activating at least a blade rotor arranged for vertical take-off and landing and transition to and from horizontal flight, said hydraulic propulsion system being powered by said at least one engine;

a housing in a fuselage of the aircraft for storing said at least a blade rotor during horizontal flight; and at least one auxiliary engine that is located on one of a lower part of the aircraft fuselage and on an empennage of the aircraft, said at least one auxiliary engine being tiltable between a vertical position and a horizontal position.

2. The system of claim 1, wherein said at least one auxiliary engine is powered by said hydraulic propulsion system that is powered by said at least one engine.

3. The system of claim 1, further comprising further ones of said blade rotor mounted on wings of the aircraft, each of the wings having a housing for storing the respective said blade rotor during horizontal flight.

4. The system of claim 1, wherein said blade rotor is mounted on one of a forward part of the aircraft fuselage and on the aircraft fuselage between an empennage and wings of the aircraft.

5. The system of claim 1, further comprising ones of said at least one auxiliary engine mounted on opposite sides of the aircraft empennage and on opposite sides of the fuselage between the aircraft wings and the empennage.

6. A system for transforming a traditional self-sustained horizontal take-off and landing aircraft with at least one engine for sustaining horizontal flight into a hybrid, integrated, self-sustained vertical take-off and landing and horizontal flight aircraft, said system comprising:

a hydraulic propulsion system powering at least a blade rotor arranged for vertical take-off and landing and transition to and from horizontal flight, said hydraulic propulsion system being powered by said at least one engine; and at least one auxiliary engine that is located on one of a lower part of the aircraft fuselage and on an empennage of the aircraft, said at least one auxiliary engine being tiltable between a vertical position and a horizontal position.

7. The system of claim 6, wherein said at least one auxiliary engine is powered by said hydraulic propulsion system that is powered by said at least one engine.

8. The system of claim 7, wherein said at least one auxiliary engine is a ducted turbofan propeller.

9. The system of claim 6, wherein one said blade rotor is mounted on each wing of the aircraft and each wing has a housing for storing the respective said blade rotor during horizontal flight.

10. The system of claim 6, wherein one said blade rotor is mounted on a forward part of the aircraft fuselage, and a second said blade rotor is mounted on the aircraft fuselage between an empennage and wings of the aircraft.

11. The system of claim 10, wherein further ones of said blade rotor are mounted on the wings.

12. The system of claim 11, wherein ones of said auxiliary engine are mounted on opposite sides of the empennage and on opposite sides of the fuselage between the wings and the empennage.

13. The system of claim 6, wherein one said blade rotor is mounted on a forward part of the aircraft fuselage, further ones of said blade rotor are mounted on the aircraft wings, and ones of said auxiliary engine are mounted on opposite sides of the aircraft empennage and on opposite sides of the fuselage between the wings and the empennage.

14. The system of claim 6, wherein said hydraulic propulsion system is powered by 100% of thrust from said at least one engine during vertical take-off and landing.

15. The system of claim 14, wherein said hydraulic propulsion system is powered by 0% of the thrust from said at least one engine during horizontal flight.

16. A vertical take-off and landing and horizontal flight aircraft, comprising:

at least one engine mounted in a fixed position on the aircraft that sustains the aircraft in horizontal flight;

a blade rotor that provides vertical thrust and is mounted on a fuselage of the aircraft;

a hydraulic propulsion system that rotates said blade rotor, said hydraulic propulsion system being powered by said at least one engine; and a pair of auxiliary stabilizing engines located on an empennage of the aircraft, said pair of auxiliary engines being tiltable between a vertical thrust position and a horizontal thrust position.

17. The aircraft of claim 16, further comprising a housing in the fuselage for storing said blade rotor during horizontal flight.

18. The aircraft of claim 16, wherein said pair of auxiliary engines is powered by said hydraulic propulsion system.

* * * * *